May 19, 1942.  W. E. McCULLOUGH  2,283,219

BEARING

Filed Nov. 24, 1939

INVENTOR.
William E. McCullough.
BY Ramsey, Kent, Chisholm & Lutz
ATTORNEYS

Patented May 19, 1942

2,283,219

UNITED STATES PATENT OFFICE 2,283,219

BEARING

William E. McCullough, Detroit, Mich., assignor to Bohn Aluminum & Brass Corporation, Detroit, Mich., a corporation of Michigan Application November 24, 1939, Serial No. 305,772

5 Claims. (Cl. 308—242)

This invention relates to an improved bearing alloy and to an improved bearing structure. While the invention aims particularly to produce a superior bearing of the interchangeable type for use in aircraft engines, it can be applied wherever bearings of the character produced are serviceable.

A primary aim of the invention is to furnish a bearing material which will support a rotating shaft without scoring even under abnormal conditions in which there is practically a total lack of the normal supply of lubricant. This object is accomplished by using as a lining material silver-lead alloy, with silver predominant.

Another object of the invention is to produce a bearing structure in which the silver-lead lining is bonded to a stronger backing material which supplies support and to which the lining is firmly bonded by an alloy bond, the whole being of such a nature that it is subject to a minimum amount of heat distortion and is extremely resistant to corrosion. To meet these requirements the backing is preferably formed of copper-nickel alloy, as will be explained subsequently.

These and other objects and advantages of the invention will become apparent as the description proceeds.

While preferred materials and forms are disclosed herein for purposes of illustration, it should be understood that various changes may be made in materials and in arrangement of parts without departing from the spirit of the invention.

This application is in part a continuation of my application Serial No. 231,101 filed September 22, 1938.

Figure 1:
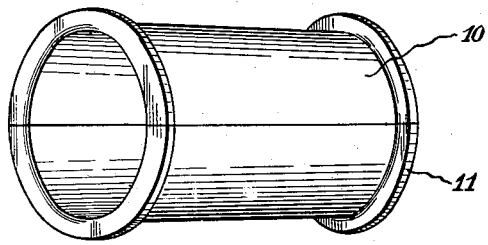
Fig. 1 is a perspective view of a typical bearing to which the invention is applied.

One of the major problems in increasing the life and efficiency of modern high-speed machinery, especially internal combustion engines, is to provide bearings of sufficient strength and stamina. The bearings must not only give long trouble-free service under normal operating conditions in which they receive a proper supply of oil, but they must be able to survive through reasonably long periods of abnormal service during which the supply of oil is not fully available. This situation is acute in airplane motors, where the operative life of the engine depends largely on the performance of the bearings, and is particularly pressing in motors for military aircraft, which must survive power dives during which the bearings are deprived of their usual full supply of oil.

The present invention meets this situation by lining the bearings with an alloy of silver and lead, silver predominating. Silver is of itself a good bearing material when properly lubricated, but tends to freeze to the shaft when lubrication fails. The softer lead appears to act as a lubricant, since the addition of a relatively small amount of lead greatly improves the performance of the bearing when running dry.

It has been found that the proportions of silver and lead may be varied within fairly wide limits, according to the characteristics desired in the bearing, although it is usually preferred to have a predominance of silver. Since silver is the harder of the two metals, the more silver the greater compressive strength the bearing will have. On the other hand, since lead is the better material for dry running, the more lead the better the bearing will withstand abuse from lack of lubrication.

In modern bearing practice standard interchangeable bearings have usually been produced by supporting a thin lining of bearing metal on a backing of a stronger metal, such as steel. The silver-lead bearing alloy cannot readily be bonded to either steel or aluminum bronze, and the present invention provides a bearing construction in which the backing material is of such a nature that the silver-lead alloy can be firmly bonded to it and which presents other advantages. The preferred backing material is an alloy of 65% nickel and 35% of copper, which is commercially sold under the trade-mark "Monel" metal.

This nickel-copper alloy forms a good bond with the silver-lead bearing alloy. In addition it has a coefficient of heat expansion close to that of the silver-base lining alloy, and hence the combined structure is subjected to minimum stresses and distortion due to differences in these coefficients. Furthermore, the nickel-copper alloy provides a wrought metal backing that has physical properties superior to those of mild steel, and which is strongly resistant to the acids which often develop in the operation of internal combustion motors.

Up to the present time I have obtained best results with bearings in which the lining material is a silver-lead alloy containing from 1 to 7½% of lead, the remainder being substantially all silver. Tests have shown that lining alloys in this range form excellent bonds with the "Monel" metal backing, and that bearings constructed of these materials give unusually good operating results.

Some of the tests that have been made indicate that lining alloys containing up to 20% or even 30% of lead, the balance being substantially silver, give as good or better results as those in the range including up to 7½% of lead, but they do not form as good bonds with the 65 Ni–35% Cu backing metal, and they should preferably be bonded to some other alloy containing nickel and copper having similar properties but of proportions that will bond with the particular silver-lead alloy. It should be understood of course that any metal or alloy having suitable physical properties and having the ability to form a good bond with the preferred silver-lead alloy may be used for the backing material, and that even with the silver-lead alloys containing up to 7½% of lead the proportions of nickel and copper may be varied somewhat from the 65–35 formula.

In manufacturing the bearing illustrated in Fig. 1 a suitable length of tubing of the nickel-copper alloy not specially treated and a quantity of the silver-lead alloy to which a small amount of sal ammoniac and naphtha were added, are heated together at 2000–2100° F. in a gas-fired furnace for approximately thirty minutes. (Another advantage of the nickel-copper alloy is that it can be heated to a temperature above the melting point of silver, which is 1800° F., thus facilitating the formation of a good bond between the bearing alloy and the shell.) The liquid bearing alloy is then deposited on the inner wall of the tube by the well-known "spinning" process, during which the tube is rotated at 900 R. P. M. and then quickly cooled with a water spray while spinning. The tube may then be split longitudinally to form sections 10 and 11 and the bearing is finished to any desired form and dimensions. In some types of bearings the tube is not split, but is finished as a one-piece tubular bearing.

Figure 3:
Fig. 3 is a reproduction of a photomicrograph showing on a greatly enlarged scale the grain structure of a typical section taken on the same line as Fig. 2.
Figure 2:
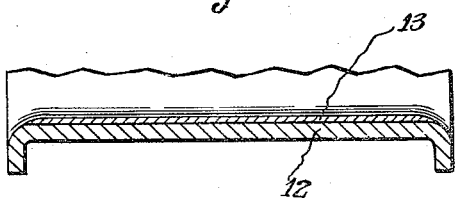
Fig. 2 is a partial longitudinal section of the bearing shown in Fig. 1.

In the completed bearing the external shell or backing, indicated at 12 in Figs. 2 and 3, supports a relatively thin lining 13 of the bearing alloy.

Fig. 3 is a reproduction of a photomicrograph of a part of the section shown in Fig. 2, and illustrates the structure of the bearing alloy, in which the higher melting-point silver forms dendrites 14, which are light-colored in the picture, the spaces between the dendritic branches being filled with the eutectic mixture of silver and lead, which shows as dark areas 15 in the picture.

This figure also illustrates the type of bond existing between the bearing layer 13 and the shell 12. The dark layer, indicated at 16, between the bearing layer and the shell is made up of an alloy of the nickel-copper alloy with the silver-lead alloy, the latter having penetrated along the boundaries of the nickel-copper alloy. This actual alloying of the bearing layer with the shell results from the fact that the bearing material is in the molten state when it is cast on the hot shell.

While the preferred lining material is an alloy of silver and lead, small amounts of other metals such as cadmium, nickel or copper may be introduced to harden or otherwise modify the properties of the alloy.

Bearings made according to this invention have given very superior results in engines for military aircraft, and it will be clear to those skilled in the art that the invention can be used in other situations where similar bearing properties are desired.

I claim:

1. In a bearing structure, a layer of bearing alloy comprising from 1 to 7½% of lead, the balance being substantially all silver.

2. In a bearing structure, a layer of bearing alloy comprising from 1 to 15% of lead, the balance being substantially all silver.

3. In a bearing structure, a layer of bearing alloy comprising from 1 to 30% of lead, the balance being substantially all silver.

4. A bearing structure comprising a backing lined with a relatively thin layer of an alloy comprising silver 80 to 95% and lead 5 to 20%.

5. The method of forming a bearing which comprises producing a molten silver-lead alloy with silver in the predominance, forming a support shell from an alloy comprising nickel and copper, heating the support shell to a temperature above the melting point of silver, and casting the molten silver-lead alloy against the hot support shell.

WILLIAM E. McCULLOUGH.